United States Patent [19]

Hatakeyama

[11] Patent Number: 5,651,135

[45] Date of Patent: Jul. 22, 1997

[54] MULTI-WAY SET ASSOCIATIVE CACHE SYSTEM IN WHICH THE NUMBER OF LINES PER SET DIFFERS AND LOADING DEPENDS ON ACCESS FREQUENCY

[75] Inventor: Tetsuo Hatakeyama, Tokyo, Japan

[73] Assignee: Kabushiki Kaisha Toshiba, Kawasaka, Japan

[21] Appl. No.: 413,010

[22] Filed: Mar. 29, 1995

[30] Foreign Application Priority Data

Mar. 30, 1994 [JP] Japan .................................. 6-060617

[51] Int. Cl.[6] ............................................................ G06F 12/02
[52] U.S. Cl. ........................... 395/455; 395/403; 395/447
[58] Field of Search .................................... 395/447, 403, 395/445, 446, 449, 455

[56] References Cited

U.S. PATENT DOCUMENTS

| 5,014,195 | 5/1991 | Farrell et al. | 395/455 |
| 5,210,843 | 5/1993 | Ayers | 395/455 |
| 5,210,845 | 5/1993 | Crawford et al. | 395/455 |
| 5,261,066 | 11/1993 | Jouppi et al. | 395/449 |
| 5,465,342 | 11/1995 | Walsh | 395/446 |
| 5,530,958 | 6/1996 | Agarwal et al. | 395/403 |
| 5,535,359 | 7/1996 | Hata et al. | 395/446 |
| 5,537,609 | 7/1996 | Whittaker et al. | 395/800 |
| 5,548,742 | 8/1996 | Wang et al. | 395/455 |
| 5,553,258 | 9/1996 | Godiwala et al. | 395/403 |

OTHER PUBLICATIONS

Handy, Jack, The Cache Memory Book, Section 1.5, "Cache Data and Cache–Tag Memories", pp. 14–22. 1993.

Jouppi, Norman P., "Improving Direct–Mapped Cache Performance by the Additon of a Small Fully–Associative Cache and Prefetch Buffers", 17th Annual International Symposium on Computer Architecture, pp. 364–373. Aug. 1990.

Seznec, Andre and Bodin, Francois, "Skewed–associative Caches", Lecture Notes in Computer Science, pp. 305–316. 1993.

"8.3 Cache", Patterson et al., Computer Architecture, pp. 408–428 (1992).

Primary Examiner—Tod R. Swann
Assistant Examiner—Keith W. Saunders
Attorney, Agent, or Firm—Finnegan, Henderson, Farabow, Garrett & Dunner, L.L.P.

[57] ABSTRACT

A set associative cache system in a computer system having a lower memory is provided with a plurality of cache memory sets. A cache data memory contains a plurality of cache lines to store data in units of blocks corresponding to data stored in the lower memory. A cache tag memory stores lower memory addresses for data stored in the cache lines. The plurality of cache memory sets have different numbers of cache lines. A read/write section reads out data stored in the lower memory into the plurality of cache lines and writing data in the plurality of cache lines back to the lower memory.

4 Claims, 6 Drawing Sheets

MULTI-WAY SET ASSOCIATIVE CACHE SYSTEM IN WHICH THE NUMBER OF LINES PER SET DIFFERS AND LOADING DEPENDS ON ACCESS FREQUENCY

BACKGROUND OF THE INVENTION

1. Field of the Invention

The present invention relates to a multi-way set associative cache system having at least two sets, each set having a plurality of cache lines, wherein blocks of a lower memory of the cache correspond to a cache line of each set in an overlapping manner, so that the hit ratio of the cache can be increased.

2. Description of the Related Art

Conventionally, there are various cache systems with various cache line structures.

First, a direct mapped cache system will be described as an example of basic cache systems.

Figure 1:
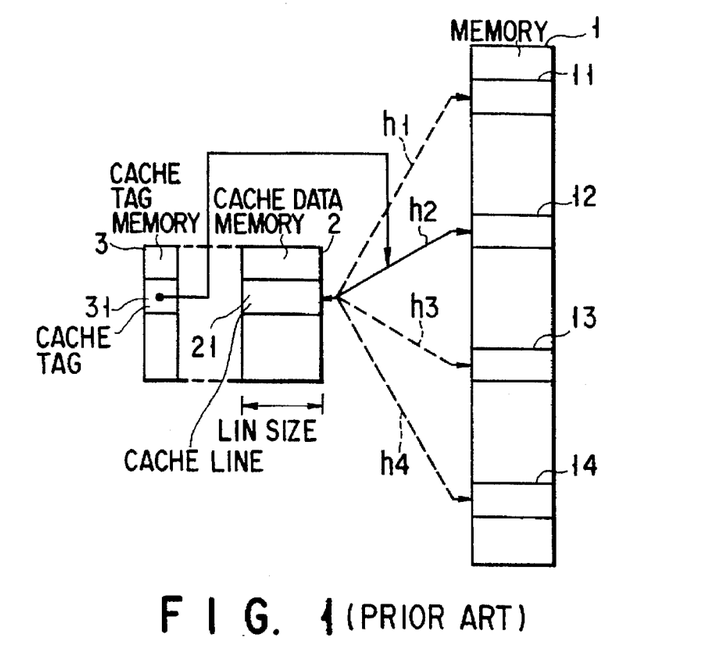
FIG. 1 is a diagram showing a conventional direct mapped cache system as an example of basic cache systems.

As shown in FIG. 1, a direct mapped cache system comprises a cache data memory 2 and a cache tag memory 3. A memory 1 is provided as a lower memory of this cache system. The term "lower" indicates that the memory is provided at a distance position from a processor. That is, if this cache system is provided for a main memory, the memory 1 is the main memory. The memory 1 has a plurality of blocks. The size of data stored in each block is called "a line size", where its unit is "a byte". With equal line sizes the blocks of the memory 1, all blocks contain the same number of bytes. Cache lines are provided accordingly for use of storing copies in data stored in blocks.

For example, a cache line 21 of the cache data memory 2 corresponds to blocks 11 to 14 of the lower memory 1, as indicated by arrows h1 to h4 in FIG. 1. In this case, the cache line 21 is capable of storing data stored in one of the blocks 11 to 14. For convenience of explanation, it is assumed that the cache line 21 stores data of the lower memory block 12.

The cache tag memory 3 has a plurality of cache tags respectively corresponding to the cache lines. Each cache tag represents the block which stores data of the corresponding cache line. More specifically, each cache tag has tag data representing an address of the block in which data stored in the corresponding cache line is stored. For example, a cache tag 31, corresponding to the cache data memory 21, has tag data representing the address of the lower memory block 12.

If the cache receives a data input/output request (access) from a CPU (central processing unit) of a processor (not indicated), the tag data is used to judge whether requested data is stored in the cache data memory.

As is well known, a hit occurs when a cache receives a data input/output request, if the data has been stored in the cache and can be immediately read out in reply to the request. A "miss" or "miss hit" occurs when the data has not been stored in the cache and data must be read from the lower memory and loaded in the cache. If a miss hit occurs, the data input/output efficiency is reduced (the process rate is lowered) since the requested data must be loaded in the cache. Hence, market demand for a cache system, having a low miss hit ratio (i.e., a high hit ratio), has been increasing.

With reference to FIG. 1, the cache line 21 stores data of the lower memory block 12, and not of the lower memory block 13, and a miss hit will thus occur if data of the block 13 is requested.

In this case, the data of the block 13 is loaded into the cache line 21, and the data of the block 12, which has been stored in the cache line 21, is lost. If the data of the block 12 is requested after the data of the block 13 is loaded in the cache line 21, a miss hit will occur again.

As described above, each of the lower memory blocks 11 to 14 in the direct mapped cache system, correspond to only one cache line of the cache data memory 2. Thus, if an input/output request for data in the lower memory blocks 11 to 14 is generated frequently, the miss hit ratio (cache miss ratio) of the entire cache system will inevitably be increased.

To reduce the miss hit ratio, a so-called multi-way set associative cache system has been proposed.

Figure 2:
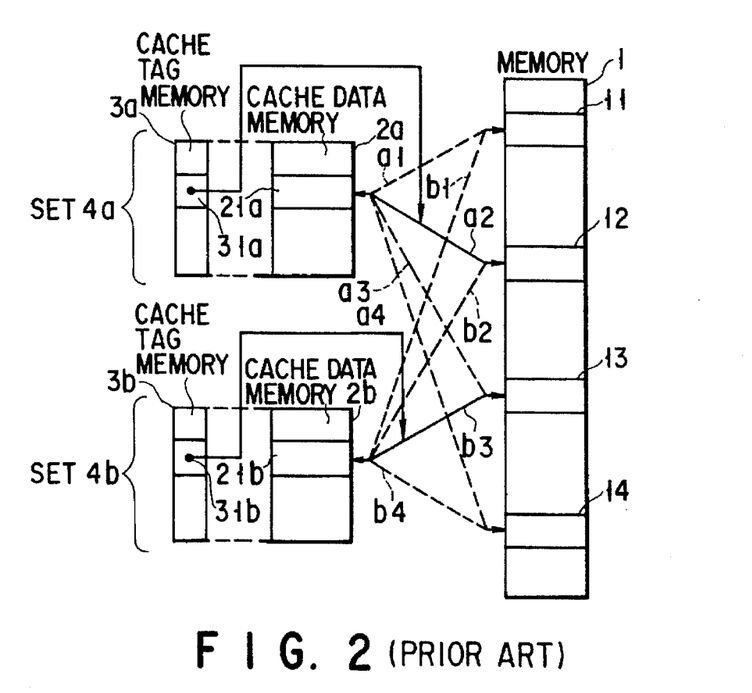
FIG. 2 is a diagram showing a conventional multi-way set associative cache system proposed to reduce the miss hit ratio.

A multi-way set associative cache system, as shown in FIG. 2, has a lower memory 1, a plurality of cache data memories 2a and 2b and a plurality of cache tag memories 3a and 3b. In other words, the multi-way set associative cache system has a plurality of sets of cache data memories and cache tag memories, whereas the direct mapped cache system described above has only one set.

More specifically, the direct mapped cache system has one set (the cache data memory 2 and the cache tag memory 3), whereas the multi-way set associative cache system has a plurality of sets, i.e., a set 4a (the cache data memory 2a and the cache tag memory 3a) and a set 4b (the cache data memory 2b and the cache tag memory 3b). Since the example shown in FIG. 2 has two sets, it is called a 2-way set associative cache system.

In FIG. 2, the blocks 11 to 14 of the lower memory 1 correspond not only to a cache line 21a (a cache tag 31a) of the cache data memory 2a, as indicated by arrows a1 to a4, but also to a cache line 21b (a cache tag 31b) of the cache data memory 2b, as indicated by arrows b1 to b4. In the direct mapped cache system (FIG. 1), the data of the block 13 cannot be stored in the cache line 21 when the data of the block 12 is stored in the cache line 21. On the other hand, since the 2-way set associative cache system shown in FIG. 2 has two sets 4a and 4b, it is possible that the blocks 11 to 14 correspond to both the cache lines 21a and 21b. Hence, for example, data of the blocks 12 and 13 can be individually stored in the cache lines 21a and 21b, so that the miss hit ratio can be lowered.

It is thus evident that the miss hit ratio is lowered as the more the number of cache memory sets of the same structure is increased. This fact has been known.

However, in the conventional cache system, even if the number of cache memory sets of the same structure is increased, the capacity of the memories required for constituting the system is increased in proportion to the number of sets, but the miss hit ratio cannot be lowered in accordance with the number of sets.

SUMMARY OF THE INVENTION

An object of the present invention is to provide a cache system in which a cache memory capacity can be reduced as compared to that in conventional systems without lowering the hit ratio of the overall cache system.

Another object of the present invention is to provide a cache system in which the miss hit ratio of the overall cache system is reduced without changing the cache memory capacity.

According to a first aspect of the present invention, a set associative cache system in a computer system having a cache memory memory, comprises: a plurality of cache memory sets including a cache data memory containing a plurality of cache lines storing data in units of blocks which corresponds to data stored in the lower memory and a cache tag memory storing lower memory addresses stored in the cache lines, at least one of the plurality of sets having a smaller number of cache lines than any other set; and read/write means for reading out data stored in the memory into the plurality of cache lines and writing data in the plurality of cache lines back to the memory.

According to a second aspect of the present invention, a set associative cache system in a computer system having a lower memory, comprises: a plurality of cache memory sets including a cache data memory containing a plurality of cache lines storing data in units of blocks which corresponds to data stored in the memory and a cache tag memory storing lower memory addresses for data stored in the cache lines, each of the plurality of sets having a different number of cache lines; and read/write means for reading out data stored in the memory into the plurality of cache lines and writing data in the plurality of cache lines back to the memory.

With the above structure, if the number of cache memory sets is the same as that of the conventional system, the capacity of a cache can be less than that in the conventional system without reducing the hit ratio of the overall cache system. If the capacity of the cache is the same as that of the conventional system, the number of sets can be increased, thereby reducing the miss hit ratio of the overall cache system.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention. In the drawings.

DETAILED DESCRIPTION OF THE PREFERRED EMBODIMENTS

A preferred embodiment of the present invention will be described with reference to the accompanying drawings.

FIGS. 3 to 6 show a multi-way set associative cache system according to a preferred embodiment of the present invention.

In the preferred embodiment, the present invention is applied to a multi-way associative cache system having three sets.

Figure 3:
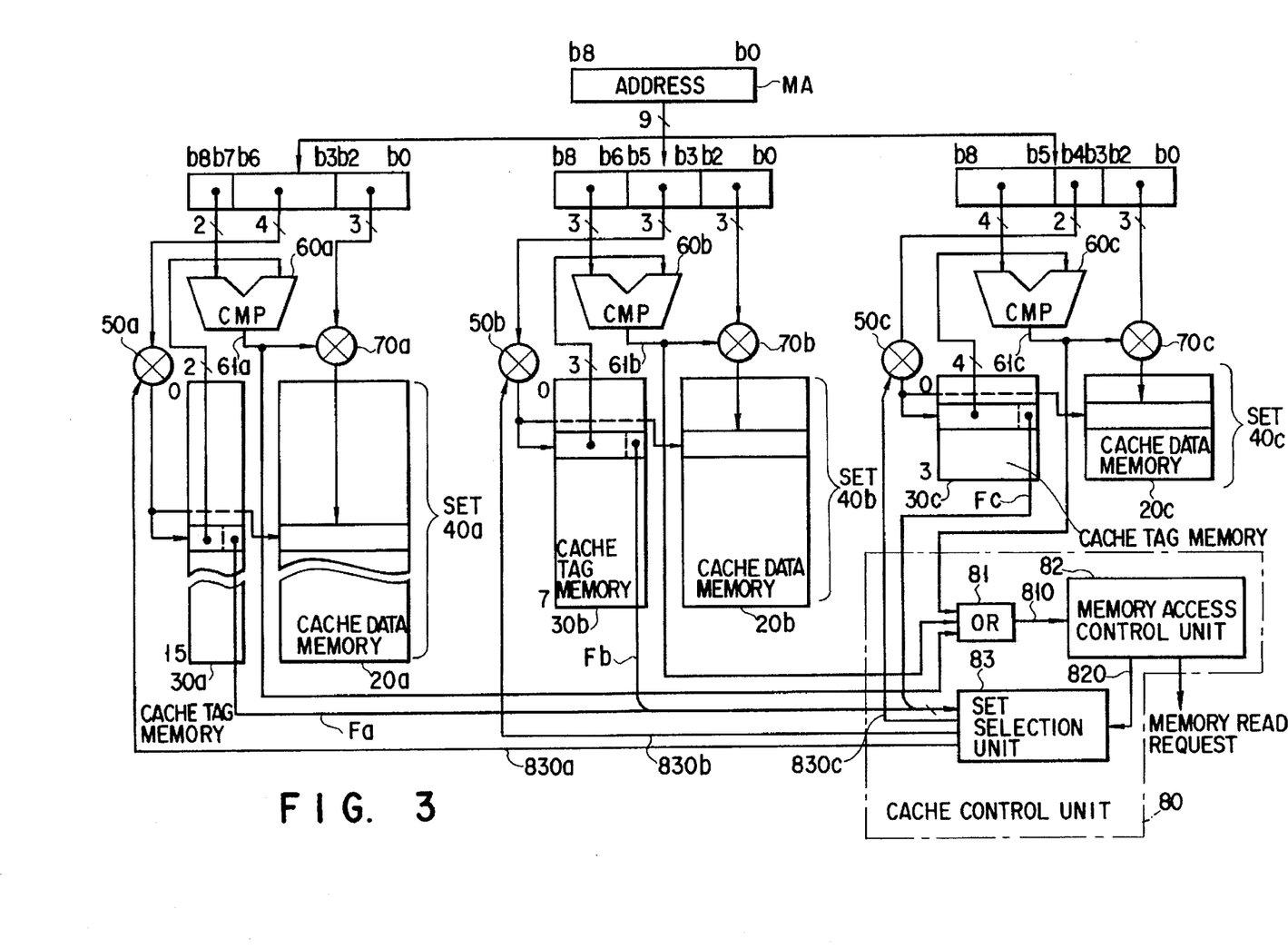
FIG. 3 is a block diagram showing a multi-way associative cache system according to an embodiment of the present invention.

As shown in FIG. 3, the multi-way associative cache system comprises a set 40a of a cache data memory 20a and a cache tag memory 30a, a set 40b of a cache data memory 20b and a cache tag memory 30b, a set 40c of a cache data memory 20c and a cache tag memory 30c and a memory 10 (not shown).

The memory 10 is provided as a lower memory of this cache system. In a general computer system, the lower memory 10 corresponds to the main memory in the case where the cache system is provided for the main memory.

The cache data memory 20a has 16 cache lines, the cache data memory 20b has 8 cache lines and the cache data memory 20c has 4 cache lines. All the cache lines have the same line size and are used to store data of one block of the memory 10 as will be described later.

It should be noted that the cache data memories have cache lines which are different in number, and accordingly, the cache data memories are different in capacity from one another. The structures of the cache data memories 20a to 20c are thus different from that of the conventional multiway set associative cache system.

Figure 4:
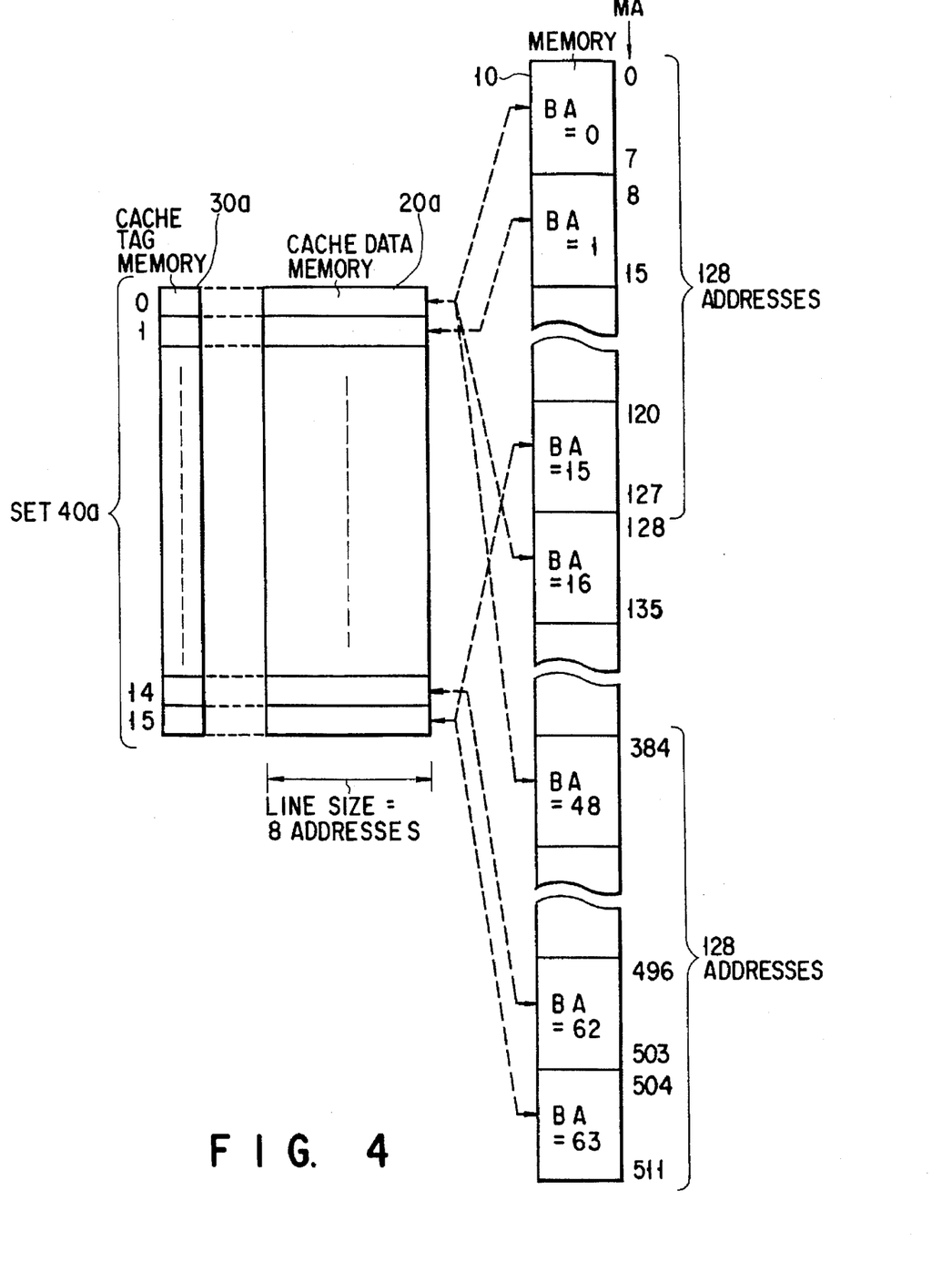
FIGS. 4 to 6 are diagrams showing the relationship between a block address in a lower processor memory and a cache line of a cache data memory included in each cache memory set shown in FIG. 3.
Figure 5:
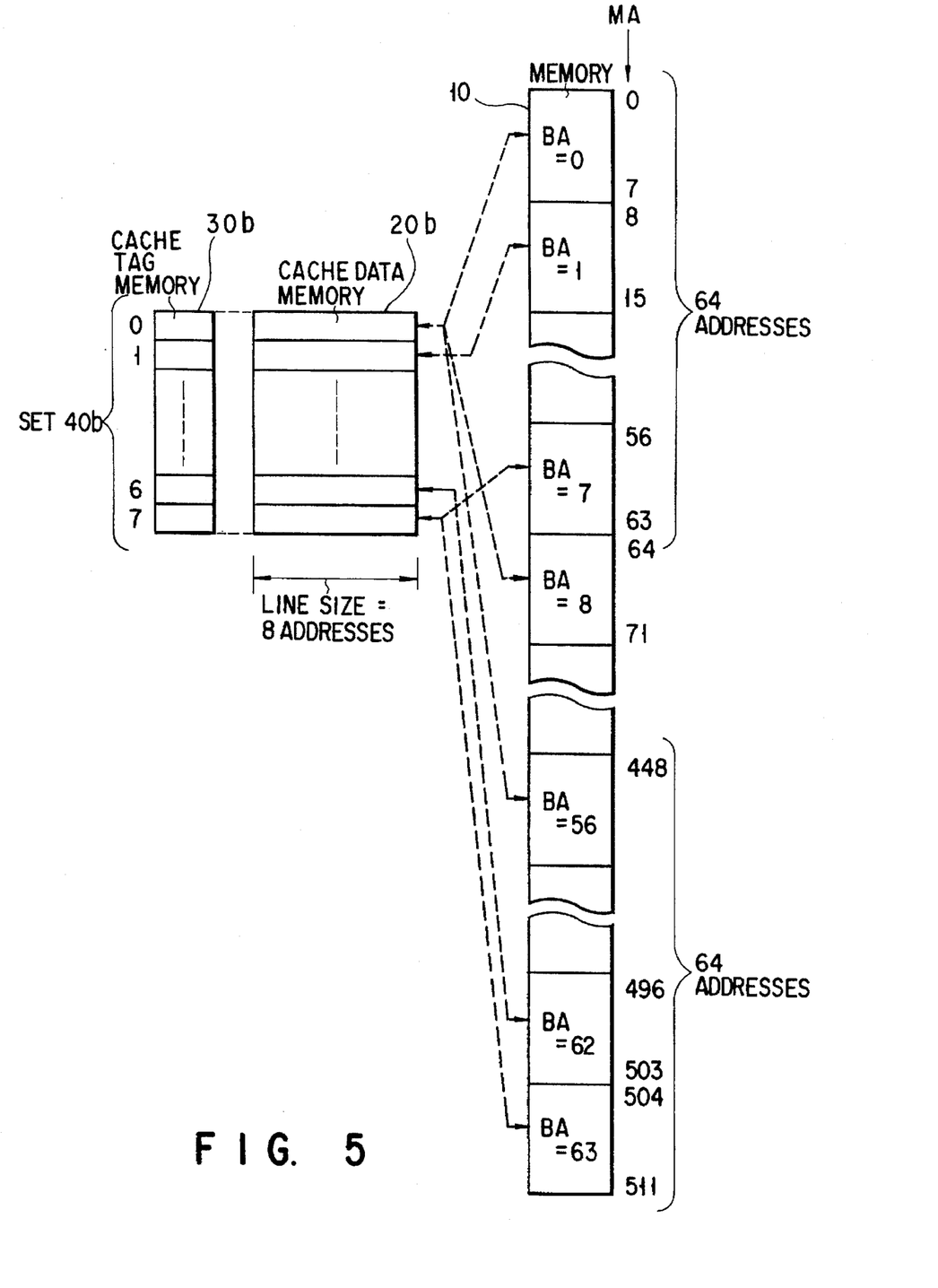

FIG. 4 shows the relationship between the set 40a and the memory 10; FIG. 5 shows the relationship between the set 40b and the memory 10; and FIG. 6 shows the relationship between the set 40c and the memory 10.

Figure 6:
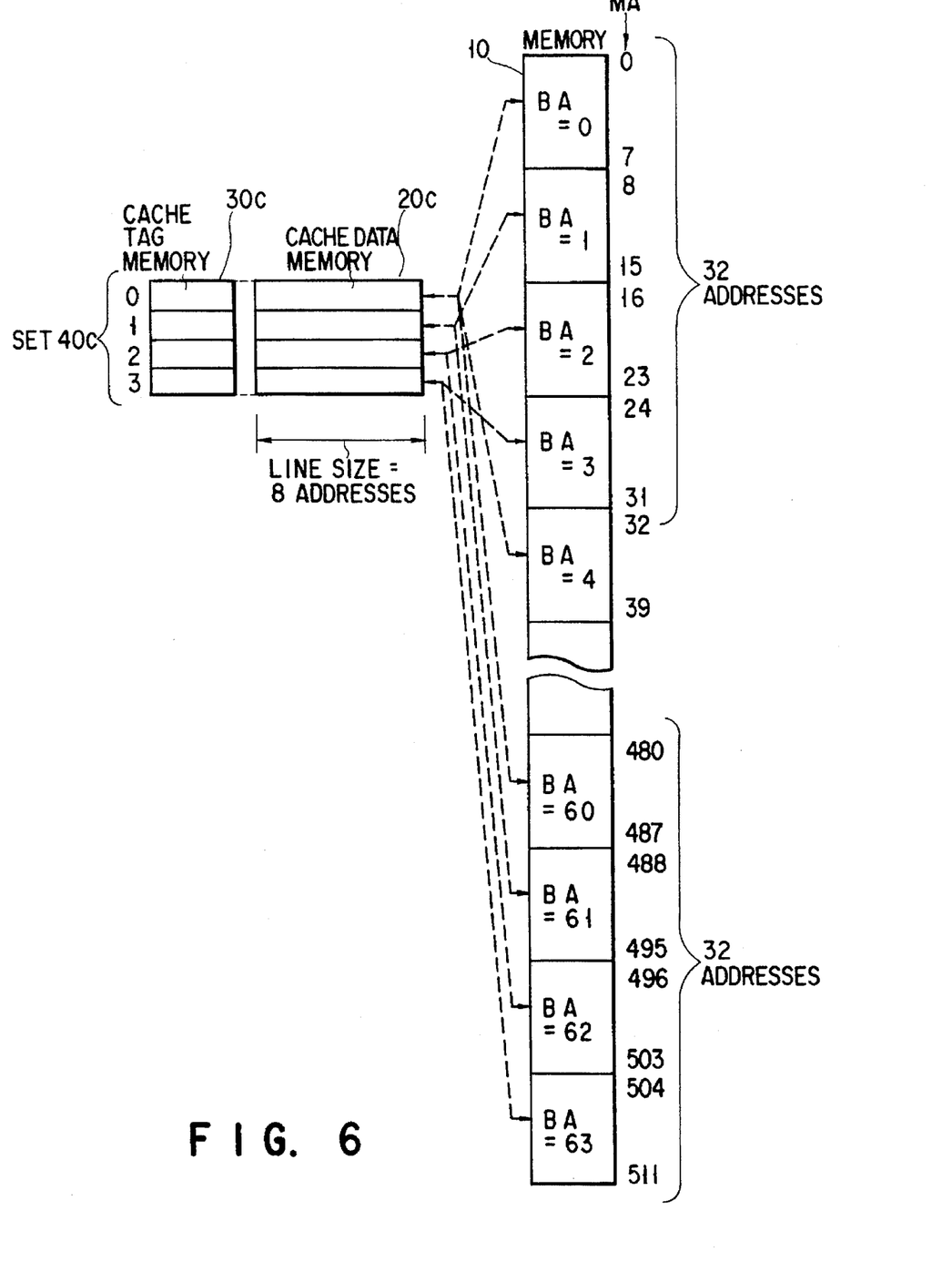

As shown in FIGS. 4 to 6, the memory 10 is divided into 64 blocks. The respective blocks are assigned block addresses "BA=0–63". Each block is divided into 8 areas. That is, the memory 10 has 512 areas. The respective areas are assigned memory addresses "MA=0–511".

For example, the memory addresses "MA=0–7" correspond to the first block address "BA=0" of the memory 10. The memory addresses "MA=8–15" correspond to the block address "BA=1". In this manner, the blocks are assigned successive memory addresses in units of 8 memory addresses. Accordingly, the final memory addresses "MA= 504–511" correspond to the final block address "BA=63" of the memory.

As regards the relationship between the cache data memory 20a and the memory 10, as shown in FIG. 4, a first cache line (cache line 0) of the cache data memory 20a corresponds to first blocks of multiple lower memory areas consisting of 16 blocks, and being the fourth of the memory 10 which consists of 64 blocks. More specifically, the first line of the cache data memory 20a corresponds to the blocks "BA=0, 16, 32, 48".

Similarly, a second cache line of the cache data memory 20a corresponds to second blocks of the lower areas (each consisting of 16 blocks), each memory area being one fourth of the memory 10. More specifically, the second cache line corresponds to the blocks "BA=1, 17, 33, 49". The last cache line (cache line 15) of the cache data memory 20a corresponds to last blocks of the lower memory areas (consisting of 16 blocks), each memory area being one fourth of the memory 10. More specifically, the last cache line corresponds to the blocks "BA=15, 31, 47, 63".

As regards the relationship between the cache data memory 20b and the memory 10, as shown in FIG. 5, a first cache line (cache line 0) of the cache data memory 20b corresponds to first blocks of multiple lower memory areas each consisting of 8 blocks), and being one eighths of the memory 10 which consists of 64 blocks. More specifically, the first line of the cache memory 202 corresponds to the blocks "BA=0, 8, . . . , 56".

Similarly, a second cache line of the cache data memory 20b corresponds to second blocks of the lower memory areas each consisting of 8 blocks and being one eighth of the memory 10. More specifically, the second cache line corresponds to the blocks "BA=1, 9, . . . , 57". The last cache line (cache line 7) of the cache data memory 20b corresponds to last blocks of the lower memory areas, each consisting of 8 blocks and being one eighth of the memory 10. More specifically, the last cache line corresponds to the blocks "BA=7, 15, . . . , 63".

As regards the relationship between the cache data memory 20c and the memory 10, as shown in FIG. 6, a first cache line (cache line 0) of the cache data memory 20c corresponds to first blocks of multiple lower memory areas, each consisting of 4 blocks and area being one sixteenth of the memory 10 which consists of 64 blocks. More specifically, the first line of the cache memory 20c corresponds to the blocks "BA=0, 4, . . . , 60". Similarly, a second cache line of the cache data memory 20c corresponds to second blocks of the lower memory areas each consisting of 4 blocks and being one sixteenth of the memory 10. More specifically, the second cache line corresponds to the blocks "BA=1, 5, . . . , 61". The last cache line (cache line 3) of the cache data memory 20c corresponds to last blocks of the lower memory areas (each consisting of 4 blocks), each area being one sixteenths of the memory 10. More specifically, it corresponds to the blocks "BA=3, 7, . . . , 63".

Each memory address of the lower memory 10 is represented by nine bits (binary number) of b8 (most significant bit), b7, . . . , b1 and b0 (least significant bit). Each block address is represented by bits b8 to b3, without use of the lower three bits of the nine bits. Thus, the binary number of the nine bits represent both a memory address and a block address. For example, the block address "BA=16" and the memory address "MA=135" are respectively represented by "010000" and "010000111".

The cache tag memory 30a, as shown in FIG. 4, has 16 cache tags respectively corresponding to the 16 cache lines of the cache data memory 20a. These cache tags are assigned arrangement numbers 0 to 15.

The cache tag memory 30b, as shown in FIG. 5, has 8 cache tags respectively corresponding to the 8 cache lines of the cache data memory 20b. These cache tags are assigned arrangement numbers 0 to 7.

Similarly, the cache tag memory 30c, as shown in FIG. 4, has 4 cache tags respectively corresponding to the 4 cache lines of the cache data memory 20c. These cache tags are assigned arrangement numbers 0 to 3.

The cache tags represent the block which stores data in the corresponding cache line.

Each cache tag of the cache tag memory 30a indicates the upper two bits (b8, b7) of the block address of data stored in the corresponding cache line. For example, a first cache tag (in line 0) of the cache tag memory 30a indicates "01", when the corresponding cache line stores data of the block address "BA=16" ("010000" in binary notation). The lower four bits (b6 to b3) of the block address represents an arrangement number of the corresponding cache tag.

The cache tag memory 30a is accessed by a CPU processor (not shown). When the CPU accesses the cache tag memory 30a, it uses a memory address of the data to be accessed and selects a corresponding arrangement number based on the lower four bits (b6 to b3) of the block address in the memory address.

Each cache tag of the cache tag memory 30b indicates the upper three bits (b8 to b6) of the block address of data stored in the corresponding cache line. For example, a first cache tag (in line 0) of the cache tag memory 30b indicates "010", when the corresponding cache line stores data of the block address "BA=16" ("010000" in binary notation). The lower three bits (b5 to b3) of the block address represents an arrangement number of the corresponding cache tag.

The cache tag memory 30b is also accessed by the CPU. When the CPU accesses the cache tag memory 30b, it uses a memory address of the data to be accessed and selects a corresponding arrangement number based on the lower three bits (b5 to b3) of the block address in the memory address.

Each cache tag of the cache tag memory 30c indicates the upper four bits (b8 to b5) of the block address of data stored in the corresponding cache line. For example, a first cache tag (in line 0) of the cache tag memory 30c indicates "0100", when the corresponding cache line stores data of the block address "BA=16" ("010000" in binary notation). The lower two bits (b4 and b3) of the block address represents an arrangement number of the corresponding cache tag.

The cache tag memory 30c is also accessed by the CPU. When the CPU accesses the cache tag memory 30c, it uses a memory address of the data to be accessed and selects a corresponding arrangement number based on the lower two bits (b4 and b3) of the block address in the memory address.

The cache tags of the cache tag memories 30a to 30c have respective flags. Flags in the cache tag memories 30a to 30c are hereinafter referred to as flags Fa to Fc. Each of the flags Fa to Fc includes a valid/invalid flag (1 bit) and a clean/dirty flag (1 bit). The valid/invalid flag represents, by "V" (valid) of "IV (invalid), whether the corresponding cache line stores valid data. The clean/dirty flag represents, by "C" (clean) or "D" (dirty), whether data in the corresponding cache line is renewed and the data is written in the memory 10 (see FIGS. 4 to 6).

The system of the present invention employs bit output gates 50a to 50c.

The gate 50a outputs bits b6 to b3 of the memory address, supplied from the CPU, as an address of the cache tag memory 30a and the cache data memory 20a of the set 40a, when a disable signal 830a supplied form a cache control unit 80 (to be described later) is invalid ("0"). The gate 50b outputs bits b5 to b3 of the memory address as an address of the cache tag memory 30b and the cache data memory 20b of the set 40b, when a disable signal 830b supplied form the cache control unit 80 is invalid ("0"). Similarly, the gate 50c outputs bits b4 and b3 of the memory address as an address of the cache tag memory 30c and the cache data memory 20c of the set 40c, when a disable signal 830c supplied form the cache control unit 80 is invalid ("0").

The present system also employs bit comparators 60a to 60c.

The comparator 60a compares bits b8 and b7 (the upper two bits of the block address) in a memory address supplied from the CPU with a cache tag read from the cache tag memory 30a, thereby detecting whether the bits coincide with the cache tag. The comparator 60b compares bits b8 to b6 (the upper three bits of the block address) with a cache tag read from the cache tag memory 30b, thereby detecting whether the bits coincide with the cache tag. Similarly, the comparator 60c compares bits b8 to b5 (the upper four bits of the block address) with a cache tag read from the cache tag memory 30c, thereby detecting whether the bits coincide with the cache tag.

In other words, the bit comparators 60a to 60c are used to detect whether a hit occurs for the cache data memories 20a to 20c hit. When each of the comparators 60a to 60c detects that the corresponding bits of the memory address coincide with the cache tag (when a hit occurs), it outputs a coincidence signal 61a, 61b or 61c. When each of the comparators 60a to 60c detects that the corresponding bits of the memory address do not coincide with the cache tag (i.e., when a miss hit occurs), it outputs a non-coincidence signal 61a, 61b or 61c. Coincidence is represented by "1" and non-coincidence is represented by "0".

The system of the present invention further employs gates 70a to 70c.

The gates 70a to 70c respectively output b2 to b0 of the memory address to the cache memories 20a to 20c in accordance with the coincidence/non-coincidence signals 61a to 61c from the comparators 60a to 60c. The outputs of the gates 70a to 70c represent word positions in the cache lines of the cache data memories 20a to 20c designated by the outputs of the bit output gates 50a to 50c.

The cache control unit 80 controls the overall system. In particular, it controls read/write operations of the cache data memories 20a to 20c and cache tag memories 30a to 30c in accordance with 1) read/write signal (not shown) supplied along with the memory address from the CPU to the cache memories, and 2) the coincidence/non-coincidence signals 61a to 61c output from the bit comparators 60a to 60c. The cache control unit 80 comprises an OR circuit 81, a memory access control unit 82 and a set selection unit 83.

The OR circuit 81 ORs the coincidence/non-coincidence signals 61a to 61c from the comparators 60a to 60c, so that it outputs a hit/miss signal 810, which represents that the data of the memory address exists in one of the cache data memories 20a to 20c or that the data does not exist in any of them. In other words, the hit/miss signal 810 represents a cache hit or cache miss (miss hit). A hit is represented by "1" and a miss hit is represented by "0".

When the OR circuit 81 outputs a hit/miss signal 810 representing a miss hit in a reading operation, the memory access control unit 82 reads from the memory 10 (see FIGS. 4 to 6) data (corresponding to 8 memory addresses) of the block designated by the upper bits (block address) excluding the lower three bits of the memory address. When the memory access control unit 82 reads block data from the memory 10, it outputs to the set selection unit 83 a record request signal 820, requesting that the data should be registered in any one of the cache data memories 20a to 20c.

The set selection unit 83 is activated by the record request signal 820 output from the memory access control unit 82. It determines a set, in which the data should be recorded, based on the flags Fa to Fc read from the cache tag memories 30a to 30c and the sizes of the sets 40a to 40c (i.e., the numbers of the cache lines contained in the cache data memories 20a to 20c of the sets 40a to 40c). It sets the state of the disable signals 830a to 830c so that the other sets cannot be selected. The logic of the selection by the set selection unit 83 is as follows.

When one of the valid/invalid flags of the flags Fa to Fc read from the cache tag memories 30a to 30c is "IV" (invalid), i.e., when the cache line of the corresponding cache data memory is free (unoccupied), the set selection unit 83 selects the set having the cache data memory which includes the free cache line.

When at least two of the valid/invalid flags of the flags Fa to Fc read from the cache tag memories 30a to 30c are "IV" (invalid), i.e., when the cache line of the corresponding cache data memory is free (unoccupied), the set selection unit 83 selects the set having the cache data memory which includes the greater number of cache lines from at least two cache data memories which includes the free cache line.

When all the valid/invalid flags of the flags Fa to Fc are "V" (valid), i.e., when the cache line of the corresponding cache data memory is not free (occupied), the set selection unit 83 selects a set comprising the cache data memory having a cache line, which has been used least recently, in accordance with, for example, the LRU (Least Recently Used) method. It is possible that the cache data memories are given priority at a predetermined rate so that a cache data memory having a greater number of cache lines can be selected at a higher possibility, and a set can be selected by the random method.

Alternatively, it is possible that a set comprising a cache data memory which has a clean cache line is given priority, and, if two or more such sets exist, a set can be selected by the LRU or random method. The purpose of giving priority to a set comprising a cache data memory, which has a clean cache line, is to make it unnecessary to write data back to the memory.

Operation of the above structure will now be described.

Assume that a request for read access to a memory address of the block address "BA=7" is given by the CPU to the system shown in FIG. 3.

In this case, the cache tag memory 30a of the set 40a is accessed through the gate 50a based on bits b6 to b3 (the lower four bits "0111" of the block address) of the memory address. At the same time, the cache tag memory 30b of the set 40b is accessed through the gate 50b based on bits b5 to b3 (the lower three bits "111" of the block address) of the memory address, and the cache tag memory 30c of the set 40c is accessed through the gate 50c based on bits b4 and b3 (the lower two bits "11" of the block address) of the memory address.

Since the block address represented by bits b8 to b3 of the memory address is "7", the lower four bits b6 to b3, the lower three bits b5 to b3 and the lower two bits b4 and b3 are respectively, "7", "7" and "3".

Accordingly, in the sets 40a and 40b, the cache tags in the cache tag memories 30a and 30b corresponding to the line 7 (the eighth cache line) of the cache data memories 20a and 20b are accessed. In the set 40c, the cache tag in the cache tag memory 30c corresponding to the line 3 (the fourth cache line) of the cache data memory 20c is accessed.

The comparator 60a compares the content of the cache tag in the cache tag memory 30a corresponding to the line 7 of the cache data memory 20a with the upper two bits b8 and b7 of the memory address, and outputs a coincidence/non-coincidence signal 61a. The comparator 60b compares the content of the cache tag in the cache tag memory 30b corresponding to the line 7 of the cache data memory 20b with the upper three bits b8 to b6 of the memory address, and outputs a coincidence/non-coincidence signal 61b. Similarly, the comparator 60c compares the content of the cache tag in the cache tag memory 30c corresponding to the line 3 of the cache data memory 20c with the upper four bits b8 to b5 of the memory address, and outputs a coincidence/non-coincidence signal 61c.

It is assumed that all of the coincidence/non-coincidence signals 61a to 61c represent "non-coincidence", that is, all of the signals 61a to 61c are "0". The coincidence/non-coincidence signals 61a to 61c are input to the OR circuit 81 of the cache control unit 80. Since all of the coincidence/ non-coincidence signals 61a to 61c are "0", the OR circuit 81 outputs the hit/miss signal 810 of "0" to the memory access control unit 82. In other words, the hit/miss signal 810 represents that a miss hit has occurred.

Since the hit/miss signal 810, output from the OR circuit in reply to the read access request from the CPU, represents that a miss hit has occurred, the memory access control unit 82 performs an access control for reading block data in the lower memory 10 (FIGS. 4 to 6) into the system. Owing to the control of the memory access control unit 82, the block data loaded in the system from the memory 10 is introduced to the cache data memories 20a to 20c in the sets 40a to 40c through data lines (not shown). At this time, the memory access control unit 82 outputs a record request signal 820 to the set selection unit 83, so that the set selection unit 83 can select a set in which the block data should be recorded.

When the set selection unit 83 detects the record request signal 820 output from the memory access control unit 82, it searches for a cache data memory having an unoccupied (free) cache line based on the valid/invalid flags of the flags Fa to Fc attached to the cache tags read from the cache tag memories 30a to 30c in order to determine where the block data read from the memory should be recorded. In this embodiment, it is assumed that none of the cache data memories 20a to 20c of the sets 40a to 40c, designated by the memory address, are occupied. In this case, all the valid/invalid flags of the flags Fa to Fc represent "IV" (invalid).

In this case, the set selection unit 83 selects the set 40a comprising the cache data memory 20a which has the greatest number of cache lines, from the sets 40a to 40c corresponding to the flags Fa to Fc representing "IV" (invalid). The unit sets the disable signals 830b and 830c corresponding to the sets 40b and 40c to "0" and maintains the disable signal 830a corresponding to the set 40a as "1".

Accordingly, the gates 50b and 50c corresponding to the sets 40b and 40c are closed, and bits b6 to b3 of the memory address (the lower four bits of the block address) are output from the gate 50a corresponding to the set 40a. The cache line (eighth cache line) of the cache data memory 20a designated by the lower four bits "0111" (which means "7") and the cache tag (eighth cache tag) of the cache tag memory 30a are write-accessed. A write signal for the write access is output from, for example, the set selection unit 83. At this time, the block data read from the memory 10 is introduced to the cache data memories 20a to 20c, and bits b8 and b7 of the memory address (the upper two bits of the block address) are introduced to the cache tag memories 30a to 30c.

As a result of the write access to the cache data memory 20a and the cache tag memory 30a, as described above, the block data "BA=7" read from the memory 10 is recorded in the eighth cache line (line 7) of the cache data memory 20a designated by bits b6 to b3 of the memory address (the lower four bits of the block address). Bits b8 and b7 of the memory address (the upper two bits of the block address) are recorded in the cache tag of the cache tag memory 30a corresponding to the line 7. At the same time, the valid/invalid flag of the cache tag is set to the "V" (valid) state and the clean/dirty flag is set to the "C" (clean) state.

Assume that, subsequently, a request for read access to a memory address of the block address "BA=23" is given by the CPU to the system shown in FIG. 3. It should be noted that the block address "BA=23", as well as the block address "BA=7" or the like, corresponds to the line 7 (the eighth cache line) of the cache data memory 20a.

In this case, since the block address represented by bits b8 to b3 of the memory address is "23" ("010111" in binary notation), the lower four bits b6 to b3, the lower three bits b5 to b3 and the lower two bits b4 and b3 are respectively, "7", "7" and "3", as in the above-described case of "BA=7".

Accordingly, in the sets 40a and 40b, the cache tags in the cache tag memories 30a and 30b corresponding to the line 7 of the cache data memories 20a and 20b are accessed. In the set 40c, the cache tag in the cache tag memory 30c corresponding to the fourth line of the cache data memory 20c is accessed.

Assume that non-coincidence is detected by all of the comparators 60a to 60c as a result of the access to the cache tag memories 30a to 30c.

In this case, the memory access control unit 82 reads the block data "BA=23" from the memory 10 and outputs a record request signal 820 to the set selection unit 83.

The set selection unit 83 searches for a cache data memory having an unoccupied (free) cache line based on the valid/invalid flags of the flags Fa to Fc attached to the cache tags read from the cache tag memories 30a to 30c. In the embodiment, the line 7 of the cache data memory 20a is occupied due to the record operation in the case of "BA=7" as described above. Therefore, only the flags Fb and Fc represent "IV" (invalid). At this time, only the line 7 of the cache data memory 20b of the set 40b and the line 3 of the cache data memory 20c of the set 40c are judged to be unoccupied (free).

In this case, the set selection unit 83 selects the set 40b comprising the cache data memory 20b which has the greatest number of cache lines, from the sets 20b and 20c. The unit sets the disable signals 830a and 830c corresponding to the sets 40a and 40c to "0" and maintains the disable signal 830b corresponding to the set 40b as "1". Then, in the same manner as in the above-described case of "BA=7", the block data "BA=23" read from the memory 10 is recorded in the line 7 of the cache data memory 20b designated by bits b5 to b3 of the memory address (the lower three bits of the block address). Bits b8 to b6 of the memory address (the upper three bits of the block address) are recorded in the cache tag of the cache tag memory 30b corresponding to the line 7. At the same time, the valid/invalid flag of the cache tag is set to the "V" (valid) state and the clean/dirty flag is set to the "C" (clean) state.

Next, assume that a request for read access to a memory address of the block address "BA=15" is given to the system shown in FIG. 3 by the CPU. It should be noted that the block address "BA=15", as well as the block addresses "BA=7", "BA=23" or the like, corresponds to the line 7 of the cache data memory 20a.

In this case, since the block address represented by bits b8 to b3 of the memory address is "15" ("001111" in binary notation), the lower four bits b6 to b3, the lower three bits b5 to b3 and the lower two bits b4 and b3 are respectively, "15", "7" and "3".

At this time, the line 7 of the cache data memory 20b is occupied due to the record operation in the case of "BA=23" as described above. On the other hand, a fifteenth line of the cache data memory 20a and a line 3 of the cache data memory 20c are not occupied. The number of the cache lines of the cache data memory 20a is greater than that of the cache data memory 20c. Accordingly, in the same manner as in the cases of "BA=7" and "BA=23", the set 40a is selected and the block data of "BA=15" read from the memory 10 is recorded in the fifteenth line of the cache data memory 20a. Bits b8 and b7 of the memory address (the upper two bits of the block address) are recorded in the cache tag of the cache tag memory 30a corresponding to the fifteenth line. At the same time, the valid/invalid flag of the cache tag is set to the "V" (valid) state and the clean/dirty flag is set to the "C" (clean) state.

Assume that, subsequently, a request for read access to a memory address of the block address "BA=39" is given by the CPU to the system shown in FIG. 3. In this case, since the block address represented by bits b8 to b3 of the memory address is "39" ("100111" in binary notation), the lower four bits b6 to b3, the lower three bits b5 to b3 and the lower two bits b4 and b3 are respectively, "7", "7" and "3".

At this time, the line 7 of the cache data memory 20a and the line 7 of the cache data memory 20b are occupied due to the record operations in the cases of "BA=7" and "BA=23" as described above. On the other hand, a line 3 of the cache data memory 20c is not occupied. In this case, the set 40c, comprising the cache data memory 20c having the line 3, which is not occupied, is selected, and the block data of "BA=39" read from the memory 10 is recorded in the line 3 of the cache data memory 20c. Bits b8 to b5 of the memory address (the upper four bits of the block address) are recorded in the cache tag of the cache tag memory 30c corresponding to the line 3. At the same time, the valid/invalid flag of the cache tag is set to the "V" (valid) state and the clean/dirty flag is set to the "C" (clean) state.

Figure 7A:
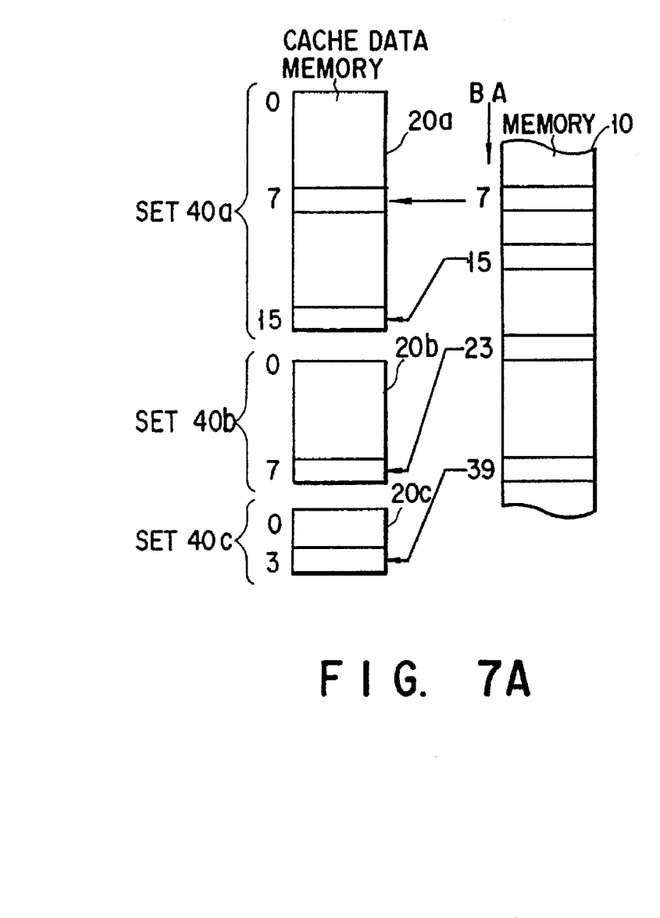
FIG. 7A is a diagram showing a state in which block data in the lower memory are loaded in cache lines of the cache data memories.

FIG. 7A shows a state in which the block data on the memory 10 corresponding to "BA=7, 15 and 23" are loaded in the cache lines of the cache data memories 20a to 20c in accordance with the above operation.

Figure 7B:
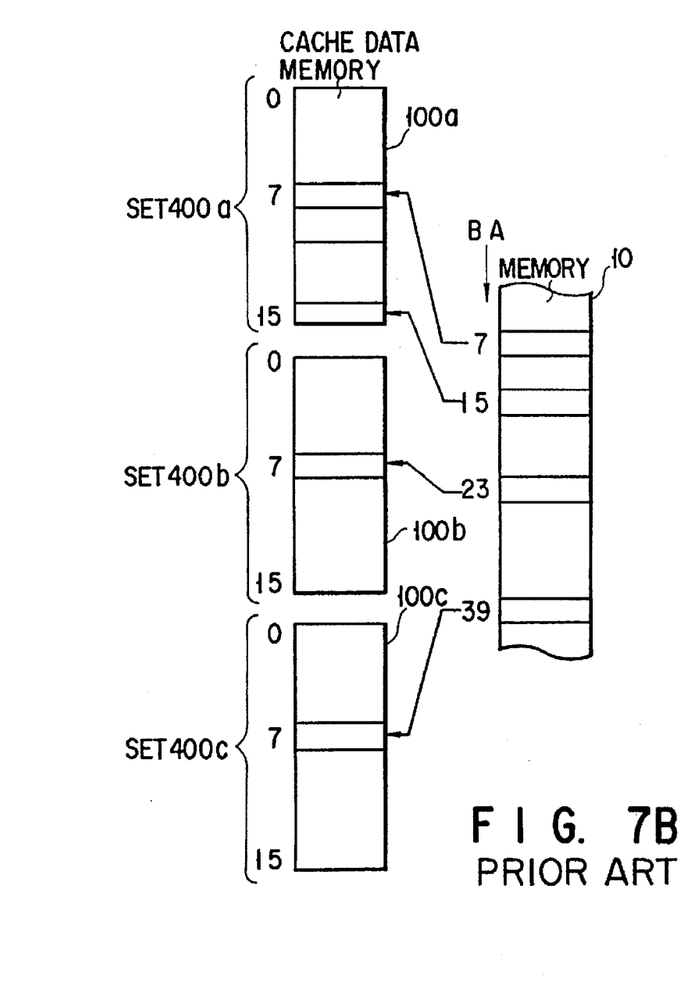
FIG. 7B is a diagram showing a state in which block data in a lower memory are loaded in cache lines of cache data memories of a conventional 3-way set associative cache system with all of the cache data memories having the same number of cache lines.

FIG. 7B shows a state of the conventional 3-way associative cache system in which the number of cache lines of each cache data memory corresponding to FIG. 7A is 16 and the same operation as described above is performed.

The sets 40a, 40b and 40c in FIG. 7A respectively correspond to sets 400a, 400b and 400c in FIG. 7B. The cache data memories 20a, 20b and 20c in FIG. 7A respectively correspond to cache memories 100a, 100b and 100c in FIG. 7B. In the conventional system as shown in FIG. 7B, lines 7 of all the three cache data memories are occupied, unlike in the system of the present invention as shown in FIG. 7A.

In the system of the present invention, since the cache data memories have sixteen, eight and four cache lines, respectively, the total number of cache lines is only 28. On the other hand, in the conventional system, since each cache data memory has 16 cache lines, the total number of cache lines is 48. Thus, according to the present invention, the total capacity of the memory can be reduced as compared to the conventional system without lowering the hit ratio of the caches.

Although the case of the 3-way set associative cache system, having three sets, has been described above as the preferred embodiment, the present invention can be applied to multi-way set associative cache systems having any number of sets. Further, in the above embodiment, the cache data memories have cache lines different in number from each other; however, it is a plurality of cache data memories can have the same number of cache lines, so long as the number of cache lines of at least one cache data memory is different from that of the others.

In the above embodiment, detection of a miss or hit of a cache, loading of data to the cache data memory, and writing data from the cache data memory back to the lower memory are automatically performed by means of the cache control unit 80. However, in other application of the invention these processes can be at least partly performed under control of software.

For example, detection of a miss or hit of a cache and loading of data to the cache data memory are automatically performed by means of the cache control unit 80. On the other hand, in another type of system, writing data from a cache data memory back to the lower memory is performed under control of software. In such a system, when data written in a cache line in which data in the cache data memory has been altered, is written back to the lower memory, the data is stored also in another memory device (e.g., an auxiliary memory device) as an execution record.

If a cache miss occurs in access based on an address, when the cache lines corresponding to the address in all the sets are occupied, data must be written back to the memory and the data in the address must be loaded in a cache line. For this reason, it is necessary to execute software for controlling the writing of the data from the cache data memory back to the lower memory. In this case, if a program of the software does not exist in the cache data memory, another cache miss may occur. Thus, it must be assured that data need not be written back to the memory.

For example, a 5-way set associative cache system may be provided wherein the cache data memories of the respective sets have 16, 16, 16, 4 and 4 cache lines. In this system, if the 16 cache lines of the three cache data memories, corresponding to the address for access to the cache data memories, have already been occupied, the cache control unit 80 informs the CPU that one of the two remaining cache lines can be used. The CPU performs a control so as to write, in the memory device, valid altered data in all the cache lines corresponding to the address for the access as an execution record, write the data back to the memory and invalidate all the cache lines corresponding to the address.

In the above case, the software program itself for the cache control is stored in a line on the other one of the two remaining cache data memories, if necessary. As a result, it is assured that no additional cache miss occurs.

As described above, the three of the five sets have capacities (16 lines) suitable for a normal data process and the remaining two sets have capacities (4 lines) required only for performing the aforementioned read access and storing the software program for the cache control.

According to the present invention, as has been described above in detail, the cache data memories constituting a multi-way set associative cache data memory system have predetermined numbers of cache lines. At least one of the cache data memories is different from the others in the number of the cache lines. In particular, when it is necessary to load data in any cache data memory so as to prevent a hit, the data is loaded in a cache data memory having the greatest number of cache lines.

For this reason, data corresponding to a memory address of a lower frequency of the input/output request (i.e., an address which does not require a greater number of sets) is loaded in a cache data memory having a greater number of cache lines, whereas data corresponding to a memory address of a higher frequency of the input/output request (i.e., an address which requires a greater number of sets) is loaded in the cache data memories distributively. Therefore, if the number of sets is the same as that of the conventional system, the memory capacity can be less than that in the conventional system without reducing the hit ratio of the overall cache system. If the memory capacity is the same as that of the conventional system, the number of sets can be increased, thereby reducing the miss hit ratio of the overall cache system.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A set associative cache system in a computer system having a lower memory, comprising:

a plurality of cache memory sets, each of which includes a cache data memory containing a plurality of cache lines for storing data in units of blocks, each of said plurality of cache lines corresponding to data stored in the lower memory, and a cache tag memory storing lower memory addresses for data stored in said cache lines, at least one of said plurality of cache memory sets having a number of cache lines than at least another one of said plurality of cache memory sets, and every address on said lower memory being associative with said plurality of cache memory sets through the same number of ways at all times; and read/write means for reading out data stored in the lower memory into said plurality of cache lines and writing data in said plurality of cache lines back to the lower memory in such a manner that data corresponding to the memory address of a lower input/output request frequency is loaded in one of the cache memory sets having a greater number of cache lines and that data corresponding to the memory address of a higher input/output request frequency is loaded in one of the cache memory sets having more available cache lines.

2. The system according to claim 1, wherein said read/write means selects the cache memory set containing a greater number of cache lines from said plurality of cache memory sets in reading out data stored in the lower memory into said plurality of cache lines.

3. A set associative cache system in a computer system having a lower memory, comprising:

at least three cache memory sets, each of which includes a cache data memory containing a plurality of cache lines for storing data in units of blocks, each of said plurality of cache lines corresponding to data stored in the lower memory and a cache tag memory storing lower memory addresses for data stored in said cache lines, said at least three sets each having a different number of cache lines from one another, and every address on said lower memory being associative with said at least three cache memory sets through the same number of ways at all times; and read/write means for reading out data stored in the lower memory into said plurality of cache lines and writing data in said plurality of cache lines back to the lower memory in such a manner that data corresponding to the memory address of a lower input/output request frequency is loaded in one of the cache memory sets having a greater number of cache lines and that data corresponding to the memory address of a higher input/output request frequency is loaded in one of the cache memory sets having more available cache lines.

4. The system according to claim 3, wherein said read/write means selects the cache memory set containing a greater number of cache lines from said at least three cache memory sets in reading out data stored in the lower memory into said plurality of cache lines.

* * * * *

UNITED STATES PATENT AND TRADEMARK OFFICE
CERTIFICATE OF CORRECTION

PATENT NO. : 5,651,135
DATED : July 22, 1997
INVENTOR(S) : Tetsuo HATAKEYAMA

It is certified that error appears in the above-indentified patent and that said Letters Patent is hereby corrected as shown below:

In Claim 1, Col. 13, line 17, after "having a", insert --different--.

Signed and Sealed this

Fourteenth Day of October, 1997

Attest:

BRUCE LEHMAN

Attesting Officer   Commissioner of Patents and Trademarks